United States Patent
Altshuler et al.

[11] 3,761,721
[45] Sept. 25, 1973

[54] MATTER WAVE INTERFEROMETRIC APPARATUS

[75] Inventors: Saul Altshuler, Manhattan Beach; Lee M. Frantz, Redondo Beach, both of Calif.

[73] Assignee: TRW Inc., Redondo Beach, Calif.

[22] Filed: July 6, 1972

[21] Appl. No.: 269,492

[52] U.S. Cl............. 250/41.3, 250/49.5 R, 350/3.5
[51] Int. Cl................................................. H01s 1/00
[58] Field of Search............... 250/49.5 R, 41.9 ME, 250/41.3; 350/3.5

[56] References Cited
UNITED STATES PATENTS
3,686,501   8/1972   Taylor et al.................. 250/49.5 ED
3,532,879   10/1970   Braunstein......................... 250/41.9

OTHER PUBLICATIONS
"The Formation of the Diffraction Image with Electrons in the Gabor Diffraction Microscope", Haine et al., J. Optical Soc. 1952

Primary Examiner—James W. Lawrence
Assistant Examiner—B. C. Anderson
Attorney—Daniel T. Anderson et al.

[57] ABSTRACT

An apparatus is disclosed which makes use of interferometry of the matter waves accompanying particles such as neutral atoms, charged ions or electrons. The apparatus includes a particle source and a beam splitter for splitting the original beam of particles into two beams having accompanying matter waves which are coherent with each other. The two beams are recombined by a pair of beam reflectors, and the resulting interference fringes may be measured by a suitable particle detector. Such an apparatus may be used for measuring variation of the gravitational field or the rate of rotation of the apparatus. In both cases the apparatus is capable of ultra precise measurement of acceleration, of the mass of an object or the rate of rotation. Alternatively, by utilizing charged particles it is possible to measure a magnetic field to obtain a magnetometer of great sensitivity. The apparatus may finally be used to carry out holography by matter waves.

17 Claims, 5 Drawing Figures

PATENTED SEP 25 1973

MATTER WAVE INTERFEROMETRIC APPARATUS

BACKGROUND OF THE INVENTION

This invention relates generally to a matter wave interferometric apparatus and particularly relates to methods for measuring acceleration, the mass of an object, the rate of rotation, the strength of a magnetic field or for practicing holography by matter waves.

The apparatus of the present invention makes use of a beam splitter of particles. Such a particle beam splitter has been disclosed in the prior U.S. Pat. to Altshuler, Braunstein and Frantz, No. 3,532,879 which issued on Oct. 6, 1970. In the prior patent to the present applicants and one other it has been disclosed and claimed to make use of a standing electromagnetic wave field for deflecting particles. This may, for example, consist of a standing light wave generated by a laser. Uncharged particles such as atoms, as well as charged particles are deflected by such a standing wave at the Bragg angle. Since some of the particles will pass the standing wave undeflected the device operates as a beam splitter.

It has now been realized that this beam splitter will split the original beam of particles into two beams carrying matter waves which are coherent, that is phase locked with each other. Therefore, if the two coherent beams are recombined in accordance with the present invention they can form interference patterns to create fringes or the like which may be detected by a particle detector.

Calculations show that such an apparatus in accordance with the invention may be used for many purposes and has a sensitivity many times that of conventional apparatus. For example, it permits to measure variations of the gravitational acceleration many times smaller than the best instruments presently available for measuring gravitational fluctuations.

It is an object of the present invention to provide a matter wave interferometer for measuring variations of a gravitational field, the mass of an adjacent object or the rate of rotation of the apparatus.

Another object of the present invention is to make use of an apparatus of the type referred to for measuring magnetic flux. Again, greater precision may be obtained and smaller fields may be measured than with prior art apparatus.

A further object of the present invention is to provide a matter wave interferometer which may be used for holography by means of matter waves.

SUMMARY OF THE INVENTION

In accordance with the present invention a matter wave interferometric apparatus comprises a source of particles. The particles may, for example, be neutral atoms or molecules or else charged particles such as ions or electrons. There is also provided a beam splitter which may be realized, for example, by the apparatus of the prior patent previously referred to. The beam splitter splits the particles into two separate beams, each carrying a matter wave in such a way that the matter waves are coherent with each other. The two coherent beams are then recombined by means of a pair of reflectors. The beam reflectors may simply consist of a suitable crystal which will reflect the particles. Alternatively, the beam reflectors may also consist of a centrally located standing electromagnetic wave pattern like the beam splitter. Finally, the recombined particles may be detected by a suitable particle detector. Alternatively, it is possible to increase in essence the size of the interference pattern by making use of the diffraction caused by a standing electromagnetic wave pattern. Thus, the wave pattern will split each beam into two adjacent beams so as to magnify the resulting interference pattern.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
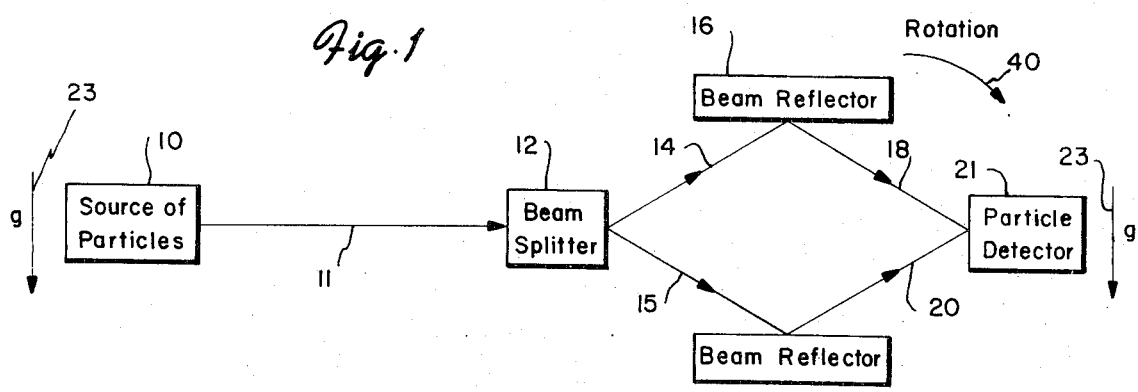
FIG. 1 is a schematic view of a matter wave interferometric apparatus in accordance with the present invention suitable for measuring the earth's gravitational acceleration or rotation of the apparatus.

Referring now to FIG. 1 there is shown apparatus in accordance with the present invention which makes it possible to measure, for example, the earth's gravitational acceleration usually designated $g$. The apparatus of FIG. 1 includes a source 10 of particles. The particles may be neutral such, for example, as neutral atoms or molecules. Alternatively, they may be charged particles such, for example, as ions or electrons. The particle source 10 accordingly will generate a beam 11 of particles which is permitted to impinge on a beam splitter 12. As indicated before, the beam splitter 12 may, for example, consist of the apparatus disclosed and claimed in the previously referred to patent. For convenience the apparatus is shown in more detail in FIG. 2 to which reference will subsequently be made.

The beam splitter 12 accordingly will generate two beams 14 and 15. The two beams are each accompanied by a matter wave which are coherent and in phase with each other. Each of the two beams 14 and 15 is then reflected by a beam reflector 16 and 17 respectively. Each beam reflector 16 or 17 may consist of a suitable crystal having an ordered crystalline lattice from which the particles are reflected by the Bragg angle. Accordingly, the two beams 14 and 15 are reflected to form two reflected beams 18 and 20 which are recombined at the plane of a particle detector 21. Alternatively, the beam reflectors 16 and 17 may also consist of a standing electromagnetic wave pattern centrally located in the path of the two beams 14 and 15 such as is used in the beam splitter 12.

The particle detector 21 may be so arranged that it permits to count the number of particles as a function of distance which is indicative of the interference pattern. Assuming that the particles to be detected are charged particles they may simply be measured by a suitable electric current detector. Thus, the ion current or electron current may be measured directly with a sensitive electrometer circuit or direct-current amplifier. It is also feasible to use an electrometer tube in a DuBridge and Brown balanced circuit together with a sensitive galvanometer. Such instruments are well known and have been described in the literature; see, for example, the book by N. F. Ramsey entitled "Molecular Beams" page 381 which was published in 1956 in Oxford by Clarendon Press.

Alternatively, if the particles are neutral atoms they may be measured by a detector similar to those explained above. Thus, it is possible to use a surface ionization detector which will first ionize the neutral atoms. After they have been ionized they may be measured as indicated above. Such a surface ionization detector may, for example, consist of a heated tungsten wire (Wolfram) which may contain some impurities. All that is necessary is to select neutral atoms which may be easily ionized when they strike such a tungsten wire. This simply means that the ionization potential of the atom should be approximately 0.5 volts smaller than the work function of the tungsten. If this condition is met all of the neutral atoms will emerge from the heated wire as ions which may then be counted by conventional methods.

Figure 2:
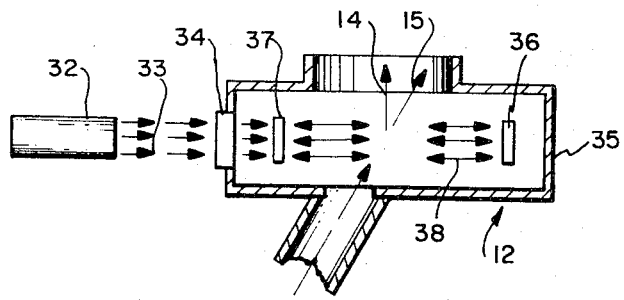
FIG. 2 is a schematic view of a particle source followed by one form of beam splitter in accordance with the present invention.

Before explaining the operation of the apparatus of FIG. 1, reference is now made to FIG. 2 which shows an embodiment of the particle source 10 and the beam splitter 12 as disclosed in FIG. 1 of the previously referred patent. The particle source 10 may include an evacuated housing 30 within which is disposed a suitable source 31 of particles. As explained before, these particles may consist of neutral atoms, molecules or else of charged particles, such as, for example, ions or electrons. The resulting particle beam 11 then enters the beam splitter 12 which preferably also is evacuated.

The beam splitter 12 may include, for example, a laser 32 or any other source which will generate a high-intensity coherent light beam. The light beam 33 of the laser 32 passes through a transparent window 34 into an evacuated housing 35 provided with a totally reflecting mirror 36 and a partially reflecting mirror 37. Accordingly, the light wave is reflected back and forth between the mirrors 36 and 37 to create a standing electromagnetic wave shown schematically at 38.

Accordingly, a portion of the incoming particle beam 11 passes through the electromagnetic standing wave 38 as shown at 15. Another portion of the beam 11 is deflected as shown at 14 in accordance with the Bragg relationship.

In accordance with the present invention a generalized Bragg relationship may be utilized. Thus, if the Bragg deflection angle is $\alpha$ we obtain the following formula:

$$\alpha = \lambda_M/\lambda_{Rad},$$

where $\lambda_M$ is the wavelength of the matter wave and $\lambda_{Rad}$ is the wavelength of the light wave. This formula may now be generalized as follows into a multi-photon Bragg angle:

$$\alpha = N\ (\lambda_M/\lambda_{Rad}),$$

where N is an integer. This simply means that N photons are absorbed or interact with each particle. Accordingly, if the frequency $v$ of the light wave is such that:

$$Nh v,$$

corresponds to the energy separation or the transition energy between levels of the particle, the particle will absorb N photons. In other words the particle will resonate with N times the light quanta. In the above formula $h$ is Plank's constant.

It should be noted that it is also feasible to incorporate the laser 32 directly into the cavity formed by the two mirrors 36 and 37 so that the two mirrors form the resonant laser cavity. The operation of the apparatus of FIG. 1 will now be described. It makes use of quantum mechanical waves or matter waves which follow the de Broglie relationship. This may be expressed as follows:

$$\lambda = h/mv$$

In this formula, $\lambda$ is the wavelength of the matter wave, $h$ is Planck's constant, $m$ is the mass of the particle, and $v$ its velocity.

It should be noted that the only other apparatus which makes use of quantum mechanical waves is the Josephson magnetometer.

Accordingly, each of the separate particle beams such as 14, 18 and 15, 20 is accompanied by matter waves. The two matter waves are coherent to each other and normally in phase. Therefore, the phases of the two waves at the particle detector 21 depend upon the path lengths traversed by each of the beams. Therefore, if the two path lengths are equal, the two matter waves will be in phase.

Additionally these phases depend upon the magnitude of the gravitational potential along each of the beam paths. The effect of the gravitational potential energy on the phase of the two matter waves is analogous to the effect of the refractive index on the phase of light waves. Thus, if $\phi$ is the difference in the phase increments of the two beams, the following formula is obtained:

$$\phi = mgy\ \sqrt{y^2 + x^2/2\hbar v} \tag{1}$$

In this formula $m$ is again the mass of the particle, $v$ its velocity, $g$ is the earth's gravitational acceleration, $x$ is the distance between the beam splitter 12 and the particle detector 21 while $y$ is the distance between the two beam reflectors 16 and 17. Finally $\hbar$ is Planck's constant divided by $2\pi$.

The formula (1) thus indicates the configuration of the interference pattern due to a gravitational field.

Assuming now that the gravitational acceleration varies like $\delta g$ we obtain the following formula:

$$\delta \phi = (my\ \sqrt{y^2 + x^2/2\hbar v})\ \delta g \tag{2}$$

It will be readily apparent that the fringe pattern due to the interference shifts in space and therefore the number of fringes n passing the detector is given by the following formula:

$$n = \delta \phi/2\pi \tag{3}$$

Assuming now that it is easily possible to observe one fringe shift due to the variations of the gravitational field, the following formula is obtained:

$$\delta g = (4\pi\hbar v/my)\sqrt{x^2 + y^2} = 5 \times 10^{-4} \text{ cm/sec}^2 \tag{4}$$

In this formula the numerical value has been obtained for $x = y = 2$ meters, $m = 10$ atomic mass units and $v = 5 \times 10^4$ cm/sec., the latter corresponding to thermal velocity.

Using the value of the earth's gravitational acceleration, we obtain the following formula:

$$\delta g/g = 5 \times 10^{-7} \tag{5}$$

It will be understood that the sensitivities given by formulas (4) and (5) may, of course, be improved, for example, by using a larger geometry, that is larger values for $x$ and $y$, and by using heavier particles as well as lower velocities. It should also be possible to measure a fraction of a fringe shift, thereby to increase the sensitivity at least by a factor of 20. This sensitivity compares favorably with presently available instruments for measuring gravity or gravitational fluctuations.

In accordance with the present invention, it is also feasible to obtain absolute measurements of $g$. However, this can only be made with less accuracy than measurements of variations in $g$. For example, by rotating the apparatus of FIG. 1 about the plane defined by beams 14, 18 and 15, 20 and counting the fringe shifts, it is possible to determine the absolute value of $g$. If the plane defined by the beams is inclined at an angle $\theta$ with respect to the force of gravity, then the phase difference is given by the following formula:

$$\phi = mgy\sqrt{y^2 + x^2}/2\hbar v \cos\theta \tag{6}$$

Accordingly, by rotating the plane of the beams through 90° and counting fringes, one may measure $g$ from the following equation:

$$g = 4\pi\hbar vn/my\sqrt{y^2 + x^2} \tag{7}$$

In the above equation, n is again the number of fringes.

Again with the same apparatus of FIG. 1 it is possible to measure the mass of an isolated adjacent object, such, for example, as a satellite in space. If the apparatus of FIG. 1 is located in the neighborhood of the object, the phase difference $\phi$ is again given by the following formula:

$$\phi = \gamma mM/\hbar v \tag{8}$$

In this equation, $\gamma$ is the gravitational constant and M is the mass of the object. For a single fringe shift, the smallest measure of the mass is determined by the following formula:

$$M = 2\pi\hbar v/\gamma m \approx 2 \times 10^8 \text{ gm} = 200 \text{ tons} \tag{9}$$

In order to obtain a value of 200 tons for the smallest measure of the mass it has been assumed that $m$ is 10 atomic units and the thermal velocity has again been assumed with the same value as previously noted.

Figure 3:
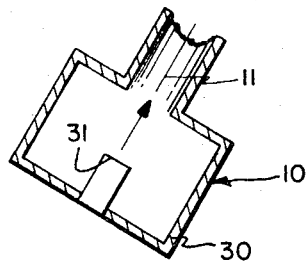
FIG. 3 is a schematic view of a crystal which may also be utilized as a beam splitter.
Figure 3:
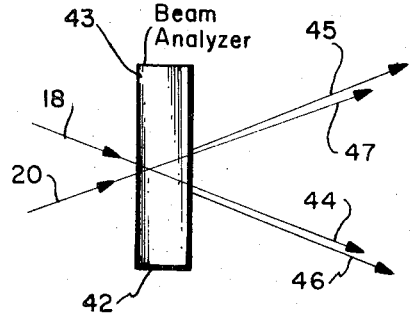

In order to detect the interference fringes, it is feasible to use a beam analyzer of the type illustrated in FIG. 3. Such a beam analyzer may be used ahead of the particle detector 21 in the apparatus of FIG. 1. The beam analyzer simply utilizes a standing electromagnetic wave pattern 42 upon which the particle beams 18, 20 impinge. Thus, an atomic-scale fringe pattern will exist at the surface 43 of the wave pattern due to the difference in the relative fields of the waves corresponding to the beams 18, 20. The wave pattern 42 now will split each one of the incoming beams 18, 20 into two beams. The original incoming beam 18 appears as a forward diffracted beam 44 and a diffracted beam 45. Similarly, the incoming beam 20 appears as a diffracted beam 46 and a forward diffracted beam 47.

It is now feasible to use either one of the two pairs of beams, namely 44, 46 or 45, 47 because each pair of beams has all of the information contained in the atomic scale fringe pattern.

For further information concerning the beam analyzer of FIG. 3, reference is made to a recent paper entitled "Interferometry with X-rays" by M. Hart and U. Bonse which appears in "Physics Today," Volume 23, No. 8, August 1970, pages 26 through 31. Reference is particularly made to FIGS. 2 and 3 of this paper. It is there stated that a crystal transforms the atomic-scale fringe pattern into a macroscopic pattern which may be observed, for example, with a counter or particle detector in one of the exit beams.

In accordance with the present invention the crystal suggested in the paper referred to above is replaced by a standing light wave. The essential principle is that if the standing light wave pattern disposed in front of the beam analyzer 42 has a different spacing than the Bragg planes of the analyzer, the two outgoing beams such as 45,47, or 44,46 will form a small angle between them as shown in FIG. 3. Outgoing waves such as these set up a standing wave pattern which now has a macroscopic spacing rather than a microscopic spacing.

It is also feasible to modulate the beam splitter cavity formed by the mirrors 36 and 37 of FIG. 2. This may be effected, for example, by changing the frequency of the standing light waves generated by the laser 32. This will cause a small angle between the two output beams 44,45 and 46,47 of FIG. 3. Since the two beams now have a small angle between them this will furnish a magnified or macroscopic fringe pattern which may be more readily detected by a particle detector.

Instead of modulating the frequency of the laser beam, it is of course also feasible to utilize two separate lasers, each of which generates a slightly different or adjacent frequency.

The same apparatus of FIG. 1 may also be used as a rotation rate sensor. Thus, assuming that the apparatus of FIG. 1 rotates as shown by the arrow 40, the angular velocity may be designated $r$. The particle beam 11 may again consist of neutral atoms or molecules or of charged particles, such as ions or electrons. With this apparatus, the difference in phase $\delta\phi$ is given as follows:

$$\delta\phi = 4A r m / h \qquad (10)$$

In the above equation, A is the area circumscribed by the beams.

It will be noted that formula (10) is independent of the velocity of the particle. For a fringe shift $\Delta n$ which is defined as follows:

$$\Delta n = \delta\phi / 2\pi \qquad (11)$$

one obtains the following formula:

$$\Delta n = (2/\pi)(A r m / h) \qquad (12)$$

The sensitivity of this angular rotation rate sensor will now be estimated. Assuming that the particles consist of cesium and that one-tenth of the fringe shift may be measured and that A is 100 square centimeters, then one obtains for $r$ the following expression:

$$r = (\pi/2)(\hbar \Delta n / A m) = 5.8 \times 10^{-9} \text{ rad/sec} \approx 10^{-3} \text{ degrees/hour} \qquad (13)$$

The sensitivity, of course, may be increased by increasing A, that is, a smaller angular rate per hour may be measured. Again the sensitivity is larger than that obtainable with presently available electromechanical devices.

Figure 4:
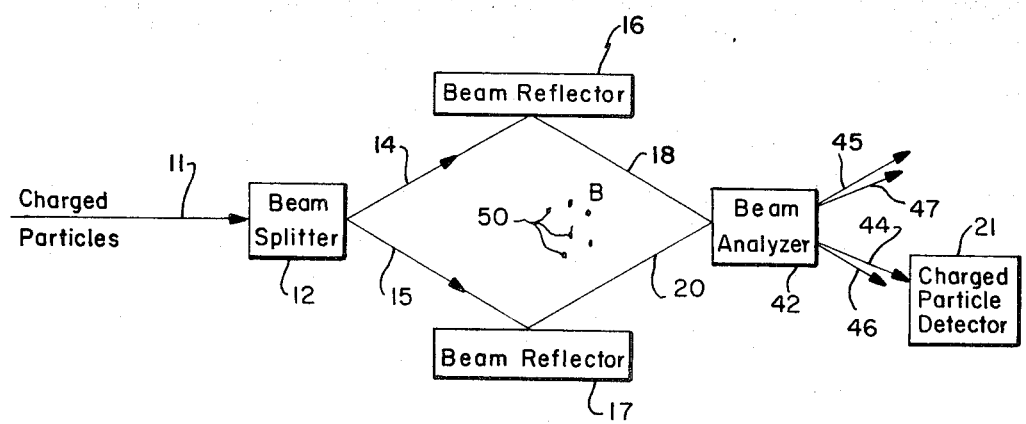
FIG. 4 is a schematic representation of a charged particle matter wave interferometric apparatus embodying the present invention and suitable for measuring a magnetic field.

The apparatus of the present invention also lends itself to provide a magnetometer. Such a device is illustrated in FIG. 4 to which reference is now made.

In this case it is necessary that the particle beam 11 consists of charged particles such as ions or electrons. Furthermore, it is assumed that a magnetic field B exists perpendicular to the plane defined by the beams 14, 15 and 18, 20. This is illustrated schematically by the dots 50 in FIG. 4.

In this case a phase difference will occur between the beams 18 and 20, and this phase difference is proportional to the total magnetic flux, that is, the product of B and the area threaded by the magnetic field.

The wave function $\Psi$ for a charged particle in a magnetic field is defined as follows:

$$\Psi = c \frac{iZe}{\hbar c} \int \overline{A} d\overline{s} \qquad (14)$$

In this equation, $\overline{A}$ is the vector potential defined as follows:

$$\text{Curl} \overline{A} = \overline{B} \qquad (15)$$

Furthermore, Z is the atomic number for the particle, $e$ is the electric charge of an electron, $d\overline{s}$ is the path of the particle over which the integral is evaluated and $c$ is the velocity of light.

By evaluating the phase shift difference $\Delta\phi$ between the two paths of FIG. 4, that is the path 14, 18 and the path 15, 20, it follows that the current I of a charged particle is oscillatory. This, of course, illustrates the interference between the beam traversing the upper path and the beam traversing the lower path.

It should also be noted that in FIG. 4 a beam analyzer 42 of the type shown in FIG. 3 has been arranged ahead of the charged particle detector 21.

The current I obtained by the current detector or particle detector is determined as follows:

$$I = I_o \cos(Ze\phi / \hbar c) \qquad (16)$$

In this equation $\phi = B \times A$ where A is the area threaded by the magnetic field. The measured current will vary with $\phi$ and will have maxima whenever $$BA = \phi = n\pi\hbar c / Ze \qquad (17)$$

In the above equation $n$ is an integer.

The sensitivity of the instrument may be estimated by assuming that one can measure one tenth the distance between two successive current peaks of the oscillatory current. In selecting an enclosed area A of 10 cm² and $Z = 1$, then the peak-to-peak fluctuation is given as follows:

$$B = \pi\hbar c / ZeA = 2 \times 10^{-9} \text{ gauss} \qquad (18)$$

for $n = 1/10$.

From this equation it is apparent that it should be possible to measure magnetic fields as small as on the order of $10^{-9}$ gauss or else to measure large fields to such a precision. Again the sensitivity of the device may be improved by selecting a larger geometry and a larger value for Z.

Figure 5:
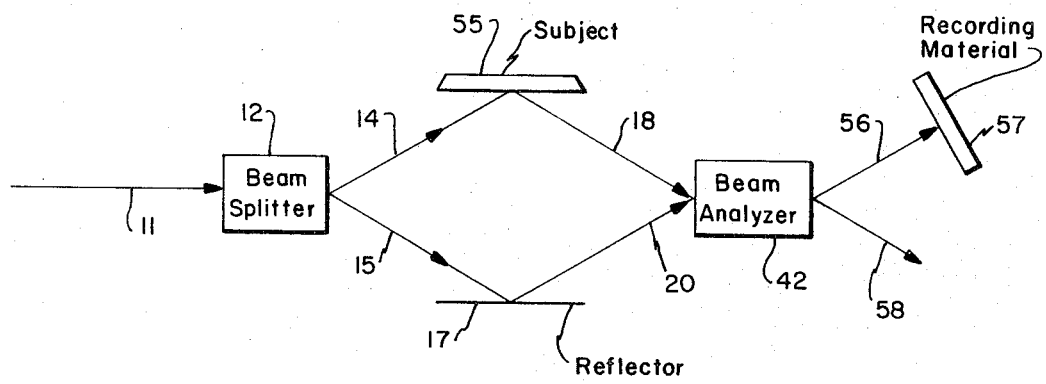
FIG. 5 is a schematic representation of an apparatus in accordance with the present invention which may be used for forming a hologram of a subject.

It is also feasible to record holograms of objects by the apparatus of the present invention. This has been illustrated in FIG. 5, to which reference is now made. Here the incoming beam 11 may consist of electrons which are split by the beam splitter 12. The output beam 15 may be reflected by reflector 17 to provide a beam 20, which may serve as a reference beam.

However, instead of the beam reflector 16 there may be provided a subject 55, the hologram of which is to be taken. Therefore, the beam 18 forms a subject beam while the beam 20 is the reference beam. The two beams may be fed through a beam analyzer 42 of the type previously disclosed. One of the output beams, such as 56, may be recorded by a suitable recording material 57 which may, for example, consist of a photographic film. It will, of course, be understood that instead of recording the beam 56, it is equally possible to record the other output beam 58. Either of the two beams contains all of the information concerning the interference between subject beam 18 and reference beam 20. The beam analyzer 42 transforms the atomic-scale fringe pattern into a macroscopic pattern, which may be recorded on the film 57.

Instead of electrons, it is of course also feasible to use other charged particles, such as positive or negative ions. It is even possible to utilize neutral atoms. However, electrons are preferred for the ease with which they may be recorded on a photographic film.

What is claimed is:

1. A matter wave interferometric apparatus comprising:
   a. a source of particles;
   b. a beam splitter disposed in the path of the particles to split the particles into two distinct beams, each carrying a matter wave, said matter waves being in phase with each other;
   c. a first and a second beam reflector disposed in the path of each of said beams and so disposed as to reflect and then recombine the two beams; and
   d. means for detecting the recombined particles.

2. Apparatus as defined in claim 1 wherein said means for detecting the particles consists of a particle detector.

3. Apparatus as defined in claim 1 wherein said means for detecting the particles consists of an additional beam analyzer for splitting each of the two beams into two separate adjacent beams, and a particle detector disposed to detect the particles from two adjacent ones of said beams.

4. Apparatus as defined in claim 3 wherein said additional beam analyzer consists of a standing electromagnetic wave disposed substantially at the plane where said two beams recombine.

5. Apparatus as defined in claim 4 wherein means are provided for varying the frequency of said standing electromagnetic wave to vary the angle between one of the beams of each pair of said two separate adjacent beams.

6. Apparatus as defined in claim 1 wherein said beam splitter consists of a standing electromagnetic wave disposed at such an angle with respect to the beam of particles so as to split the beam into a deflected and an undeflected beam having coherent matter waves.

7. Apparatus as defined in claim 1 wherein said first and second beam reflectors consist of a standing electromagnetic wave disposed substantially centrally between said two distinct beams for reflecting each of said beams and recombining them.

8. Apparatus as defined in claim 1 wherein the particles are charged particles.

9. A matter wave interferometric apparatus for recording a hologram comprising:
   a. a source of charged particles;
   b. a beam splitter disposed in the path of the charged particles to split the particles into two distinct beams, each carrying a matter wave, said matter waves being in phase with each other;
   c. a first beam reflector disposed in the path of one of said beams consisting of a reflecting crystal;
   d. a subject serving as a beam reflector disposed in the path of the other one of said beams, said beam reflectors being so disposed as to reflect and recombine the two beams; and
   e. means for recording the recombined particles thereby to record a hologram of the subject.

10. The method of determining variations of a gravitational field which comprises the steps of:
    a. generating a first beam of particles;
    b. splitting said first beam into a second and third beam each having matter waves which are coherent with each other;
    c. reflecting the second and third beam so as to subsequently recombine the two beams; and
    d. detecting the recombined beams, whereby fringes are created at the point where the second and third beams recombine as a function of the gravitational field.

11. The method defined in claim 10 which includes the additional step of splitting the second and third beam substantially where they recombine each into two adjacent beams.

12. The method defined in claim 10 wherein the variation of the gravitational field is due to the mass of an adjacent object, whereby the fringes are a measure of the mass of the object.

13. The method of measuring a magnetic field which comprises the steps of:
    a. generation a beam of charged particles;
    b. splitting the beam of charged particles into a second and third beam extending in a plane substantially normal to the direction of the magnetic field;
    c. reflecting the second and third beam to recombine the two beams; and
    d. detecting the charged particles substantially where they recombine whereby variation of the current represented by the charged particles and due to the interference fringes created thereby are a measure of the magnitude of the magnetic field.

14. The method defined in claim 13 wherein the two beams are each split into two adjacent beams substantially at the point where they recombine to magnify the interference effects.

15. The method of recording a hologram of a subject by means of matter waves which comprises the steps of:
    a. generating a beam of particles;
    b. splitting the beam of particles into a second and a third beam, each carrying a matter wave, the matter waves being in phase with each other;
    c. reflecting the second beam;
    d. reflecting the third beam by the subject to be holographed;
    e. directing the second and third reflected beam toward an area of intersection; and
    f. splitting the second and third beam each into two adjacent beams and recording one of said second and one of said third split beams to provide a hologram of the subject.

16. The method defined in claim 15 wherein the particles are electrons.

17. The method of determining the velocity of rotation by a shift of interference fringes which comprises the steps of:
    a. generating a first beam of particles;
    b. splitting said first beam into a second and third beam, each having matter waves which are coherent with each other;
    c. reflecting the second and third beams so as to subsequently recombine the two beams;
    d. rotating the second and third beam in a plane; and
    e. detecting the recombined beams, whereby fringes are created at the point where the second and third beams recombine, the velocity of rotation being determined by the shift of the interference fringes.

* * * * *

UNITED STATES PATENT OFFICE
CERTIFICATE OF CORRECTION

Patent No. 3,761,721      Dated September 25, 1973

Inventor(s) Saul Altshuler and Lee M. Frantz

It is certified that error appears in the above-identified patent and that said Letters Patent are hereby corrected as shown below:

Column 8, Formula 18 shown as $$B = \pi \hbar c / ZeA = 2 \times 10^{-9} \text{ gauss}$$

should be $$\delta B = \pi \hbar c / ZeA = 2 \times 10^{-9} \text{ gauss}$$

Signed and sealed this 29th day of January 1974.

(SEAL)
Attest:

EDWARD M. FLETCHER, JR.      RENE D. TEGTMEYER
Attesting Officer      Acting Commissioner of Patents